United States Patent
Park (10) Patent No.: US 6,287,238 B1
(45) Date of Patent: Sep. 11, 2001

(54) FORCED DOWNSHIFT CONTROL METHOD FOR AUTOMATIC TRANSMISSION

(75) Inventor: Kwang-Il Park, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/469,542

(22) Filed: Dec. 22, 1999

(30) Foreign Application Priority Data

Apr. 29, 1999 (KR) .................................................. 99-15399

(51) Int. Cl.$^7$ .................................................. F16H 61/08
(52) U.S. Cl. .................... 477/143; 477/144; 477/149; 477/161
(58) Field of Search .................... 477/144, 161, 477/143, 158, 132, 149

(56) References Cited

U.S. PATENT DOCUMENTS

| | | | |
|---|---|---|---|
| 5,445,579 | * 8/1995 | Fujita et al. | 477/132 X |
| 5,730,683 | * 3/1998 | Usuki et al. | 477/143 |
| 5,743,826 | * 4/1998 | Usuki et al. | 477/143 X |
| 5,785,628 | * 7/1998 | Kamada et al. | 477/143 X |
| 5,848,951 | * 12/1998 | Lee | 477/149 X |
| 5,961,421 | * 10/1999 | Hishiya et al. | 477/144 X |

* cited by examiner

Primary Examiner—Charles A Marmor
Assistant Examiner—Ha Ho
(74) Attorney, Agent, or Firm—Birch, Stewart, Kolasch & Birch, LLP (57) ABSTRACT

A forced downshift control method for automatic transmissions, wherein, if shift signals of a forced 4–2 downshift are input, a first shift control solenoid valve (SCSV-A) is controlled to OFF; a second shift control solenoid valve SCSV-B is maintained in an OFF state for a predetermined period of time (t1) then controlled to ON; a third shift control solenoid valve (SCSV-C) is continuously maintained in an ON state, then is immediately controlled to OFF and first and second pressure control solenoid valves (PCSV-A) and (PCSV-B) are duty controlled. The method further includes performing a first duty control operation to complete shifting through control of the first pressure control solenoid valve (PCSV-A); performing a second duty control operation to complete shifting by performing a second open-loop duty control operation; performing a third duty control operation to complete shifting through control of the second pressure control solenoid vale (PCSV-A); performing a fourth duty control operation to complete shifting by performing a fourth open-loop duty control operation; performing a fifth duty control operation to complete shifting by performing a fifth open-loop duty control operation; and performing a sixth open-loop duty control operation, regardless of variations in power conditions, to complete shifting.

26 Claims, 10 Drawing Sheets

FORCED DOWNSHIFT CONTROL METHOD FOR AUTOMATIC TRANSMISSION

BACKGROUND OF THE INVENTION (a) Field of the Invention

The present invention relates to an automatic transmission, and, more particularly, to a forced downshift control method for an automatic transmission which prevents the generation of shift shock when changing from a power OFF to a power ON state during forced 4–2 downshifting.

(b) Description of the Related Art

Conventional automatic transmissions used in vehicles include a torque converter, a multi-stage gear shift mechanism connected to the torque converter, and a plurality of friction elements actuated by hydraulic pressure for selecting one of the gear stages of the gear shift mechanism, the gear shift mechanism being realized through a planetary gearset. The friction elements are controlled to engaged and disengaged states by a hydraulic control system, which controls hydraulic flow generated by an oil pump, to change shift ratios of the planetary gearset.

The friction elements are selectively operated by a plurality of valves, which undergo port conversion to change the flow of hydraulic pressure, and actuators supplying hydraulic pressure to the valves. Further, a manual valve, indexed with a driver-operated shift select lever to realize port conversion, is connected to a plurality of lines to supply hydraulic pressure from the oil pump to each valve and actuator.

In the automatic transmission structured as in the above, when changing shift modes (P, R, N, D, 2 and L), and when changing into different speeds within the drive D range, the friction elements are changed from a disengaged state to an engaged state and vice versa. A timing of the engagement of specific friction elements in relation to the disengagement of other specific friction elements determines overall shift quality of the automatic transmission. Accordingly, much research has been conducted on shift control methods that better effect such operations.

The different possible shift operations in the drive D range of the automatic transmission in the case where there are a total of four speeds include (a) downshifting successively from a fourth speed to a first speed; (b) upshifting successively from the first speed to the fourth speed; (c) forced downshifts, or kickdown, from the fourth speed to a second speed, and from a third speed to the first speed; and (d) driver-induced skip upshifting from the first to third speed, and the second to fourth speed. The present invention relates to the method of controlling forced downshifts from the fourth speed to the second speed of the drive D range.

When performing a forced 4–2 downshift, the driver abruptly depresses the accelerator pedal in a state of driving in the fourth speed. This causes a sudden rise in throttle pressure, and if road speed is not too high, a forced downshift into the second speed will occur. If the conditions are right for the forced downshift to occur, an end clutch is disengaged, a kickdown servo is maintained engaged, and a rear clutch is controlled to an engaged state, all at the time of changing from a power OFF to a power ON state. In the conventional automatic transmission, if the power state is changed into the power ON state, an end clutch pressure is maintained by open-loop control until a second speed synchronization point is reached.

However, in the power OFF forced 4–2 downshift described above, by maintaining end clutch pressure using open-loop control when changing into the power ON state, operation of the end clutch is continued in a state where operational pressure is being supplied to the rear clutch. This causes shift shock at the end of the shifting operation such that shift quality and ride comfort are reduced.

SUMMARY OF THE INVENTION

The present invention has been made in an effort to solve the above problems.

It is an object of the present invention to provide a forced downshift control method for an automatic transmission which prevents the generation of shift shock when changing from a power OFF to a power ON state during forced 4–2 downshifting using feedback duty control, thereby improving overall shift quality and ride comfort.

To achieve the above object, the present invention provides a forced downshift control method for an automatic transmission. In the method, if shift signals of a forced 4–2 downshift are input, a first shift control solenoid valve SCSV-A is controlled to OFF immediately when the start of shifting is detected; a second shift control solenoid valve SCSV-B is maintained in an OFF state for a predetermined period of time (t1) after shifting is started, then controlled to ON; a third shift control solenoid valve SCSV-C is continuously maintained in an ON state, then after a Thold has elapsed following the detection of synchronization, is immediately controlled to OFF; and first and second pressure control solenoid valves PCSV-A and PCSV-B are duty controlled.

The method includes the steps of:

performing a first duty control operation to complete shifting through control of the first pressure control solenoid valve PCSV-A by comparing, based on three conditions, an end clutch input release time to with a filter time and a displacement time of a spool of a rear clutch and determining which of the three conditions is satisfied, and performing a first open-loop duty control operation according to the condition that is satisfied and determining if conditions for control from a power OFF forced 4–2 downshift to a power ON forced 4–2 downshift are satisfied, then performing the first duty control operation if the conditions are met;

performing a second duty control operation to complete shifting by performing a second open-loop duty control operation if conditions for control from a power OFF forced 4–2 downshift to a power ON forced 4–2 downshift are not satisfied, then determining if conditions for control from a power OFF forced 4–2 downshift to a power ON forced 4–2 downshift are now satisfied, and performing the second duty control operation if the conditions are met;

performing a third open-loop duty control operation, regardless of variations in power conditions, to complete shifting if conditions for control from a power OFF forced 4–2 downshift to a power ON forced 4–2 downshift are not satisfied;

performing a third duty control operation to complete shifting through control of the second pressure control solenoid valve PCSV-A by comparing, based on two conditions, the end clutch input release time $t_o$ with the filter time and the displacement time of the spool of the rear clutch and determining which of the two conditions is satisfied, and performing the third open-loop duty control operation according to the condition that is satisfied and determining if conditions for control from a power OFF forced 4–2 downshift to a power ON forced 4–2 downshift are satisfied, then performing the third duty control operation if the conditions are met;

performing a fourth duty control operation to complete shifting by performing a fourth open-loop duty control operation if conditions for control from a power OFF forced 4–2 downshift to a power ON forced 4–2 downshift are not satisfied, then determining if conditions for control from a power OFF forced 4–2 downshift to a power ON forced 4–2 downshift are now satisfied, and performing the fourth duty control operation if the conditions are met;

performing a fifth duty control operation to complete shifting by performing a fifth open-loop duty control operation if conditions for control from a power OFF forced 4–2 downshift to a power ON forced 4–2 downshift are not satisfied, then determining if conditions for control from a power OFF forced 4–2 downshift to a power ON forced 4–2 downshift are now satisfied, and performing the fifth duty control operation if the conditions are met; and performing a sixth open-loop duty control operation, regardless of variations in power conditions, to complete shifting if conditions for control from a power OFF forced 4–2 downshift to a power ON forced 4–2 downshift are not satisfied.

According to a feature of the present invention, the first open-loop duty control operation is realized by controlling duty from 0% to $D_{A1}$, then through slope $\alpha 1$.

According to another feature of the present invention, the first duty control operation is realized by controlling duty to 100% and maintaining duty at 100% for a period of Ta, then reducing duty to $D_{A2}$ and performing feedback control until a condition of $(Nt_2-Nt)<\Delta Nta$ is satisfied; increasing duty by $\Delta Dk$ every period until synchronization is detected after the condition of $(Nt_2-Nt)<\Delta Nta$ is satisfied; and controlling duty to 100% if synchronization is detected, then maintaining duty at 100% for a period of Thold.

According to yet another feature of the present invention, the second open-loop duty control operation is realized by controlling duty from 0% to $D_{A1}$, then to $D_{A3}$ through slope $\alpha 1$, after which duty is maintained at $D_{A3}$.

According to still yet another feature of the present invention, the second duty control operation is realized by controlling duty to 100% and maintaining duty at 100% for a period of Ta, then reducing duty to $D_{A2}$ and performing feedback control until a condition of $(Nt_2-Nt)<\Delta Nta$ is satisfied; increasing duty by $\Delta Dk$ every period until synchronization is detected after the condition of $(Nt_2-Nt)$ $<\Delta Nta$ is satisfied; controlling duty to 100% if synchronization is detected, then maintaining duty at 100% for a period of Thold; and controlling duty to 0% after the period of Thold has elapsed, thereby completing shifting.

According to still yet another feature of the present invention, the third open-loop duty control operation is realized by controlling duty from 0% to $D_{A1}$, then to $D_{A3}$ through slope $\alpha 1$; maintaining duty at $D_{A3}$ until synchronization is detected; controlling duty to 100% after synchronization is detected, then maintaining duty at 100% for a period of Thold; and controlling duty to 0% after the period of Thold has elapsed, thereby completing shifting.

According to still yet another feature of the present invention, a standard value of $t_o$ is 96 ms; a standard value of $D_{A1}$ is 72%, and a standard value of $\alpha 1$ is 32% per second; a standard value of Thold is 60 ms; and a standard value of $D_{A3}$ is 87%.

According to still yet another feature of the present invention, the third open-loop duty control operation is realized by controlling duty to 100% immediately at the start of shifting, maintaining duty at 100% for a period of $t_2$ or $[t_2+\{t_o-(t_2+t_F)\}]$, then controlling duty to 0%; and maintaining duty at 0% for a period of $t_F$.

According to still yet another feature of the present invention, the third duty control operation is realized by controlling duty to 100%; maintaining duty at 100% for a period of $t_{X1}$, then controlling duty to Dk %; maintaining duty at Dk % until a condition of $(Nt_2-Nt)<\Delta Nta$ is satisfied, and controlling duty through slope Dk until synchronization is detected; and controlling duty to 0% after synchronization is detected.

According to still yet another feature of the present invention, the period of $t_{X1}$ is a remaining time of intervals A and B+utilization time of interval C+utilization times of intervals D and E, and is calculated by the following:

$$t_{X1} = \frac{[(N_{t2} - XN_2) - Nt]/60}{dN_{i3}} + \frac{XN_2 - XN_1}{dN_{i2}} + \frac{XN_1/60}{dN_{i1}}$$

According to still yet another feature of the present invention, the fourth open-loop duty control operation is realized by controlling duty to 100% immediately at the start of shifting, maintaining duty at 100% for a period of $t_2$ or $[t_2+\{t_o-(t_2+t_F)\}]$, then controlling duty to 0%; maintaining duty at 0% for a period of $t_F$, and controlling duty to $D_{B1}$ then through slope $\beta 1$ until a condition of $(Nt-Nt_4)<\Delta Nt1$ is satisfied; and increasing duty by as much as $\Delta D_B$ and controlling duty through slope $\beta 2$.

According to still yet another feature of the present invention, the fourth duty control method is realized by controlling duty to 100%; maintaining duty at 100% for a period of $t_{X2}$ then controlling duty to 0%; maintaining duty at 0% for a period of $t_{F2}$, and controlling duty to Dk %; maintaining duty at Dk % until a condition of $(Nt_2-Nt)$ $<\Delta Nta$ is satisfied, then controlling duty through slope Dk until synchronization is detected; and controlling duty to 0% after synchronization is detected.

According to still yet another feature of the present invention, the period of $t_{X2}$ is a remaining time of interval C+utilization times of intervals D and E, and is calculated by the following:

$$t_{X2} = \frac{[(N_{t2} - XN_1) - Nt]/60}{dN_{i2}} + \frac{XN_1/60}{dN_{i1}}$$

According to still yet another feature of the present invention, the fifth open-loop duty control operation is realized by controlling duty to 100% immediately at the start of shifting, maintaining duty at 100% for a period of $t_2$ or $[t_2+\{t_o-(t_2+t_F)\}]$, then controlling duty to 0%; maintaining duty at 0% for a period of $t_F$, and controlling duty to $D_{B1}$ then through slope $\beta 1$ until a condition of $(Nt-Nt_4)<\Delta Nt1$ is satisfied; and increasing duty by as much as $\Delta D_B$ and controlling duty through slope $\beta 2$ until a condition of $Nt_2-Nt<\Delta Nta$ is satisfied.

According to still yet another feature of the present invention, the fifth duty control operation is realized by controlling duty through slope $\beta 3$ starting from when a condition of $Nt_2-Nt<\Delta Nta$ until synchronization is detected; and controlling duty to 0% after synchronization is detected, thereby completing shifting.

According to still yet another feature of the present invention, $\beta 3$ is compensated according to variations in throttle opening using a map stored in a memory.

According to still yet another feature of the present invention, the sixth open-loop duty control operation is realized by controlling duty to 100% immediately at the start of shifting, maintaining duty at 100% for a period of $t_2$ or $[t_2+\{t_o-(t_2+t_F)\}]$, then controlling duty to 0%; maintaining duty at 0% for a period of $t_F$, and controlling duty to $D_{B1}$ then through slope $\beta 1$ until a condition of $(Nt-Nt_4)<\Delta Nt1$ is satisfied; increasing duty by as much as $\Delta D_B$ and controlling duty through slope $\beta 2$ until synchronization is detected; and controlling duty to 0% after duty is detected to complete shifting.

According to still yet another feature of the present invention, a standard value of $t_2$ is 60 ms; a standard value of $T_F$ is 140 ms; a standard value of $D_{B1}$ is 50% when $N_o \geq 1500$ rpm and 60% when $N_o<1500$ rpm; $\beta 1$ is 28% per second; and $\beta 2$ is 16% per second.

According to still yet another feature of the present invention, the three conditions include a first condition of $t_o \leq t_F$, a second condition of $t_F < t_o \leq (t_2+t_F)$, and a third condition of $(t_2+t_F)<t_o$.

According to still yet another feature of the present invention, if the first condition is satisfied, duty is controlled to 0% from the moment shifting starts until $t_2+t_F+t_o$, then at the moment of $t_2+t_F+t_o$, duty is controlled to $D_{A1}$, after which duty is controlled to a slope $\alpha 1$; if the second condition is satisfied, duty is controlled to 0% from the moment shifting starts until $t_2+t_F-t_o$, then at the moment of $t_2+t_F-t_o$, duty is controlled to $D_{A1}$, after which duty is controlled to a slope $\alpha 1$; and if the third condition is satisfied, duty is controlled to $D_{A1}$ when shifting starts, after which duty is controlled to a slope $\alpha 1$.

According to still yet another feature of the present invention, synchronization is determined to be detected when $Nt_2-Nt<\Delta Nt_2$.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1:
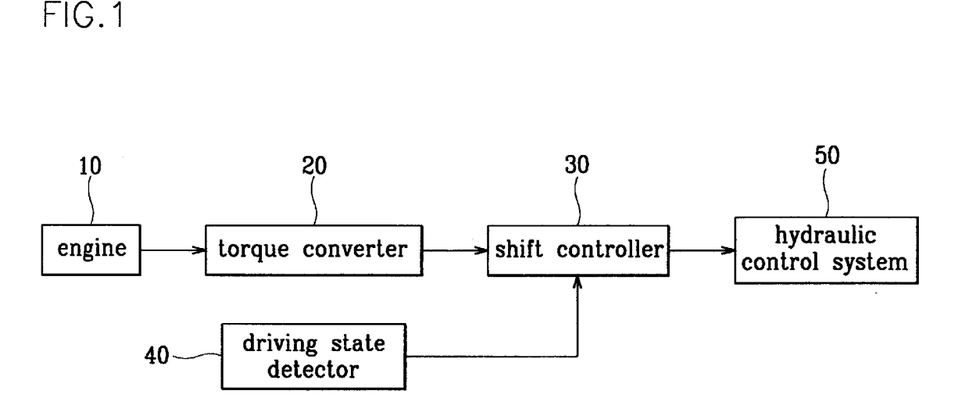
FIG. 1 shows a block diagram of a shift control system and interrelated elements for automatic transmissions to which is applied a forced downshift control method according to a preferred embodiment of the present invention.

FIG. 1 shows a block diagram of a shift control system and interrelated elements for automatic transmissions to which is applied a forced downshift control method according to a preferred embodiment of the present invention. The shift control system and interrelated elements include an internal combustion engine 10; a torque converter 20 operating as a fluid link between the engine 10 and a transmission (not shown); a shift controller 30 performing control to effect shifting into different shift modes and speeds; a driving state detector 40 for detecting overall driving conditions such as vehicle speed, throttle opening, transmission temperature, etc., and outputting corresponding signals to the shift controller 30; and a hydraulic control system 50 which controls hydraulic flow generated by an oil pump by control of the shift controller 30 to vary engaged and disengaged states of friction elements for shifting into different shift modes and speeds.

The shift controller 30 determines the overall driving stage of the vehicle by the signals received from the driving state detector 40, and outputs duly pattern signals using data of a pre-set map table to control the hydraulic control system 50. The hydraulic control system 50, in turn, operates solenoid valves according to the control signals received from the shift controller 30. As a result, specific friction elements are operated such that shifting into the desired shift mode or suitable speed is realized. In a drive D mode, either upshifting or downshifting is realized into a speed appropriate to the present throttle opening, vehicle speed, and rpm of a turbine in the torque converter 20.

Figure 2:
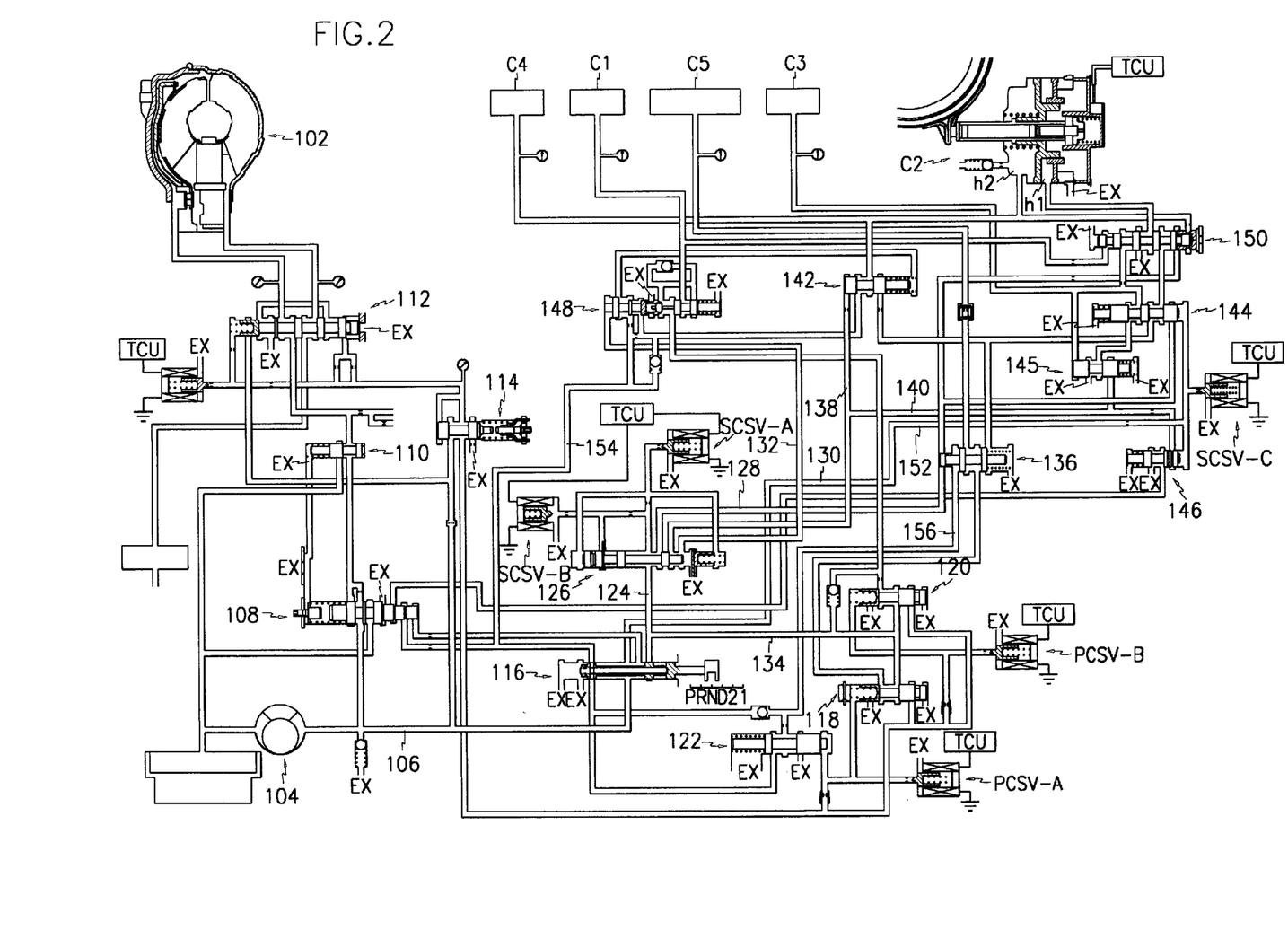
FIG. 2 is a hydraulic circuit diagram of a hydraulic control system to which is applied the forced downshift control method according to the preferred embodiment of the present invention.

FIG. 2 shows a hydraulic circuit diagram of a hydraulic control system to which is applied the forced downshift control method according to the preferred embodiment of the present invention. The hydraulic control system comprises a torque converter 102 directly connected to and driven by a crankshaft of an engine and which acts as a fluid link between the engine and a transmission, the torque converter 102 driving an input shaft of the transmission; and an oil pump 104 which includes a drive gear mounted to a pump drive hub of the torque converter 102 and a driven gear meshed with the drive gear, the oil pump 104 being driven to generate hydraulic flow to produce hydraulic pressure in the hydraulic control system.

Connected to a line 106 through which hydraulic pressure generated by the oil pump 104 flows are a pressure regulator valve 108 for controlling the hydraulic flow received from the oil pump 104 to a predetermined level of pressure, a torque converter control valve 110 which receives the hydraulic pressure from the pressure regulator valve 108 and controls the hydraulic pressure to a predetermined level suitable for the torque converter 102 and for lubrication, and a damper clutch control valve 112 which controls a damper clutch to improve a power transmission efficiency of the torque converter 102.

Part of the hydraulic pressure generated as a result of the hydraulic flow produced by the oil pump 104 is supplied to a reducing valve 114 which maintains pressure at a level lower than line pressure, and a manual valve 116 indexed with a driver-manipulated shift select lever to realize port conversion. Hydraulic pressure reduced to a predetermined level by the reducing valve 114 is supplied to a first pressure control valve 118 and a second pressure control valve 120 which control the hydraulic pressure for use as control pressure for different shift modes and speeds.

Part of the hydraulic pressure supplied to the first and second pressure control valves 118 and 120 is supplied to an N-R control valve 122, the N-R control valve 122 acting to reduce shift shock when shifting from a neutral N range to a reverse R range. Also, when the manual valve 116 is indexed in the drive D mode by operation of the shift select lever, a shift control valve 126, realizing port conversion by operation of a first shift control solenoid valve SCSV-A and a second shift control solenoid valve SCSV-B, communicates with a line 124, and the shift control valve 126 operates together with the manual valve 116 to realize shift control.

A second speed line 128, a third speed line 130 and a fourth speed line 132 are connected to the shift control valve 126, and a first speed line 134 is branched from the line 124 to supply line pressure to the first and second pressure control valves 118 and 120. The first and second pressure control valves 118 and 120 realize port conversion by operation of the first and second pressure control solenoid valves PCSV-A and PCSV-B, respectively, with the first pressure control valve 118 supplying control pressure to friction elements during shift control, and the second pressure control valve 120 supplying drive pressure to a rear clutch C1 which operates as an input element in a first speed.

The second speed line 128 of the shift control valve 126 supplies hydraulic pressure to a left-side port of a 1–2 shift valve 136 to control the same. The third speed line 130 is branched into a first branch line 138 and a second branch line 140. The first branch line 138 supplies hydraulic pressure to a 2–3/4–3 shift valve 142 to control the same, and the second branch line 140 is again branched at an end portion thereof to supply hydraulic pressure to an end clutch valve 145 and a high/low pressure valve 146.

The fourth speed valve 132 communicates a left-side port of a rear clutch release valve 148 and a right-side port of the 2–3/4—3 shift valve 142 and controls the rear clutch release valve 148 and the 2–3/4–3 shift valve 142. Further, a fail-safe valve 150 is provided between some of the valves described above and at least two friction elements, and acts to perform shifting into a most suitable shift speed when a transmission control unit (TCU) is malfunctioning or when one of the valves is sticking.

A timing control valve 152 is connected to the manual valve 116. Hydraulic pressure flowing through the timing control valve 152 is used as control pressure of the control switch valve 144, and is controlled by a third shift control solenoid valve SCSV-C.

When the manual valve 116 is positioned in the reverse R range, hydraulic pressure supplied to a reverse first control line 154 is supplied to a front clutch C4 via the rear clutch release valve 148 and the 2–3/4–3 shift valve 142. At the same time, hydraulic pressure supplied to a reverse second control line 156 passes through the 1–2 shift valve 136 and is supplied to a low-reverse brake C5, the low-reverse brake C5 operating as a reaction element in the reverse R range. Also, part of the hydraulic pressure supplied to the front clutch C4 is supplied simultaneously to a release side chamber h2 of the kickdown servo C2.

An end clutch valve 160 is provided on the second branch line 140 of the third speed line 130, the third speed line 130 supplying third speed pressure to the control switch valve 144. The end clutch valve 160 is controlled by operational pressure of an end clutch C3.

The control switch valve 144 is controlled by the third shift control solenoid valve SCSV-C to supply hydraulic pressure of the second speed line 128 of the shift control valve 126 to an operational side chamber h1 of the kickdown servo C2 in second, third and fourth speeds of the drive D range, and, simultaneously, to receive control pressure of the first pressure control valve 118 passing through the 1–2 shift valve 1336 and supply the control pressure to the operational side chamber h1 of the kickdown servo C2 and the end clutch C3.

Figure 3A:
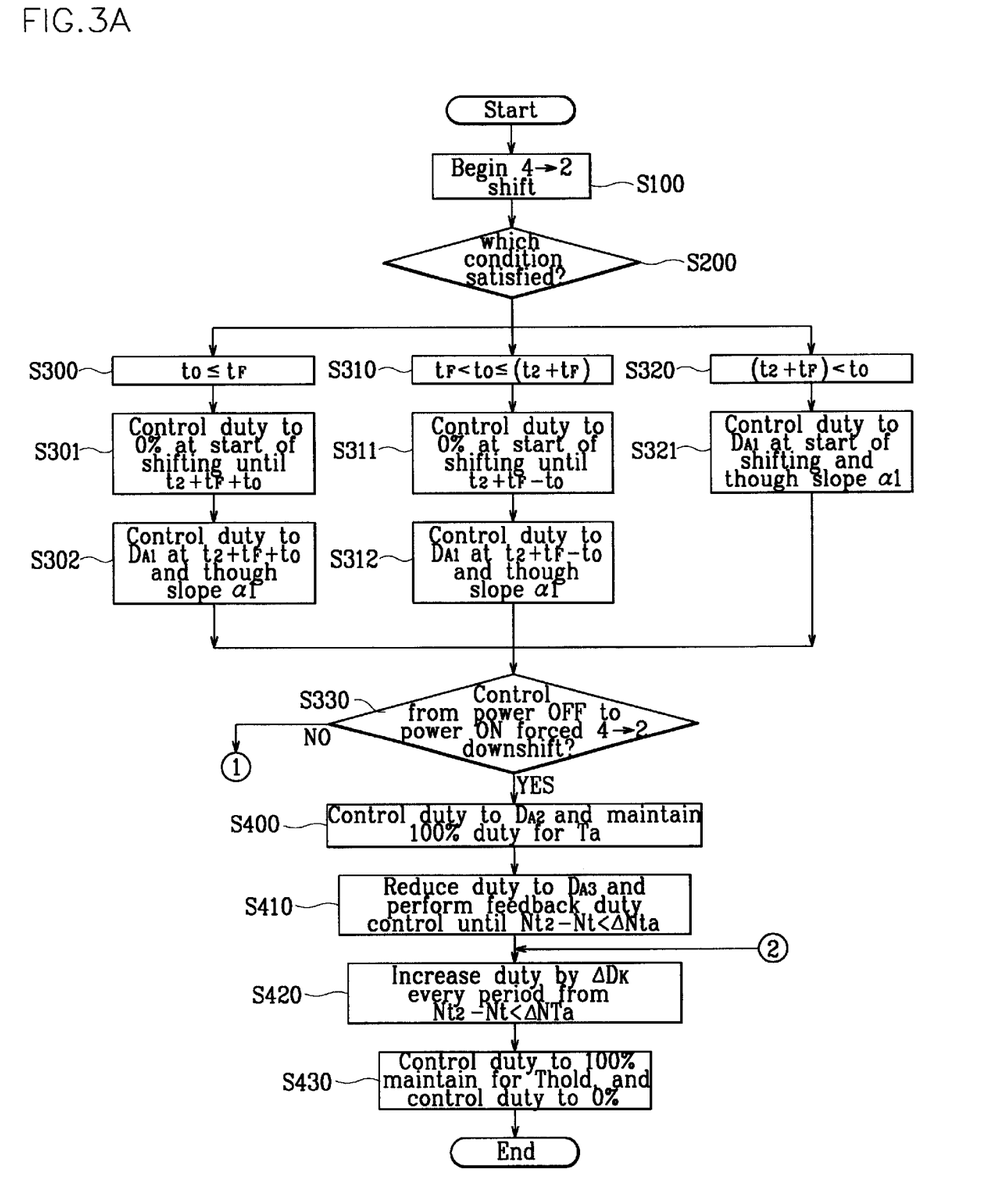
FIGS. 3a and 3b are flow charts of a method for controlling a first pressure control solenoid valve during a forced downshift according to a preferred embodiment of the present invention.
Figure 3B:
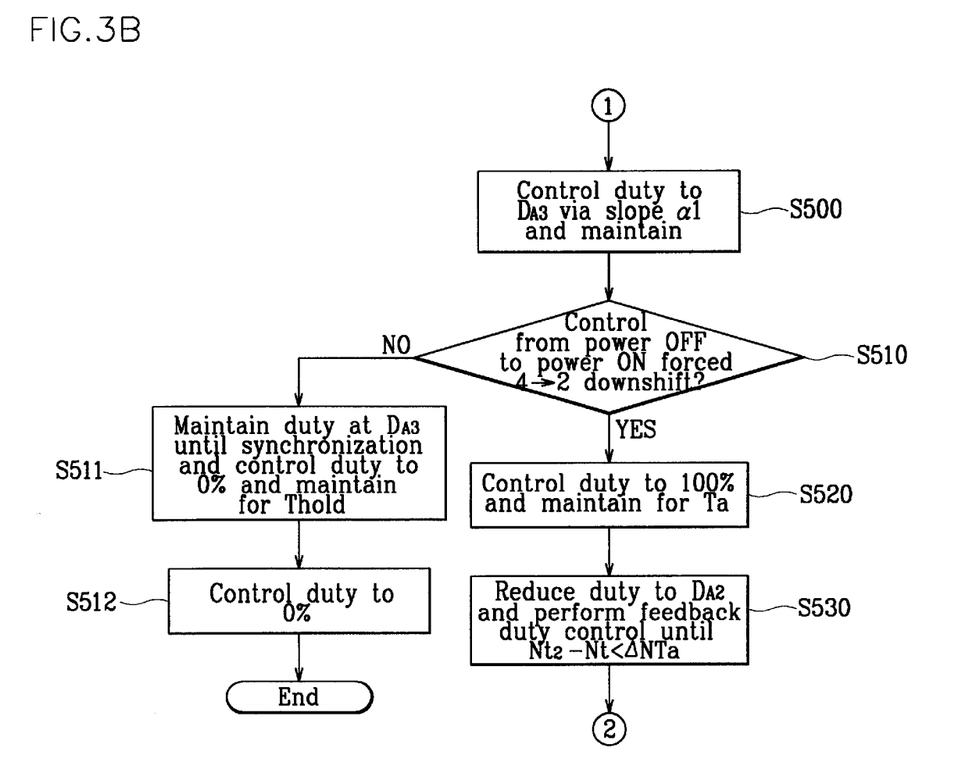
Figure 5:
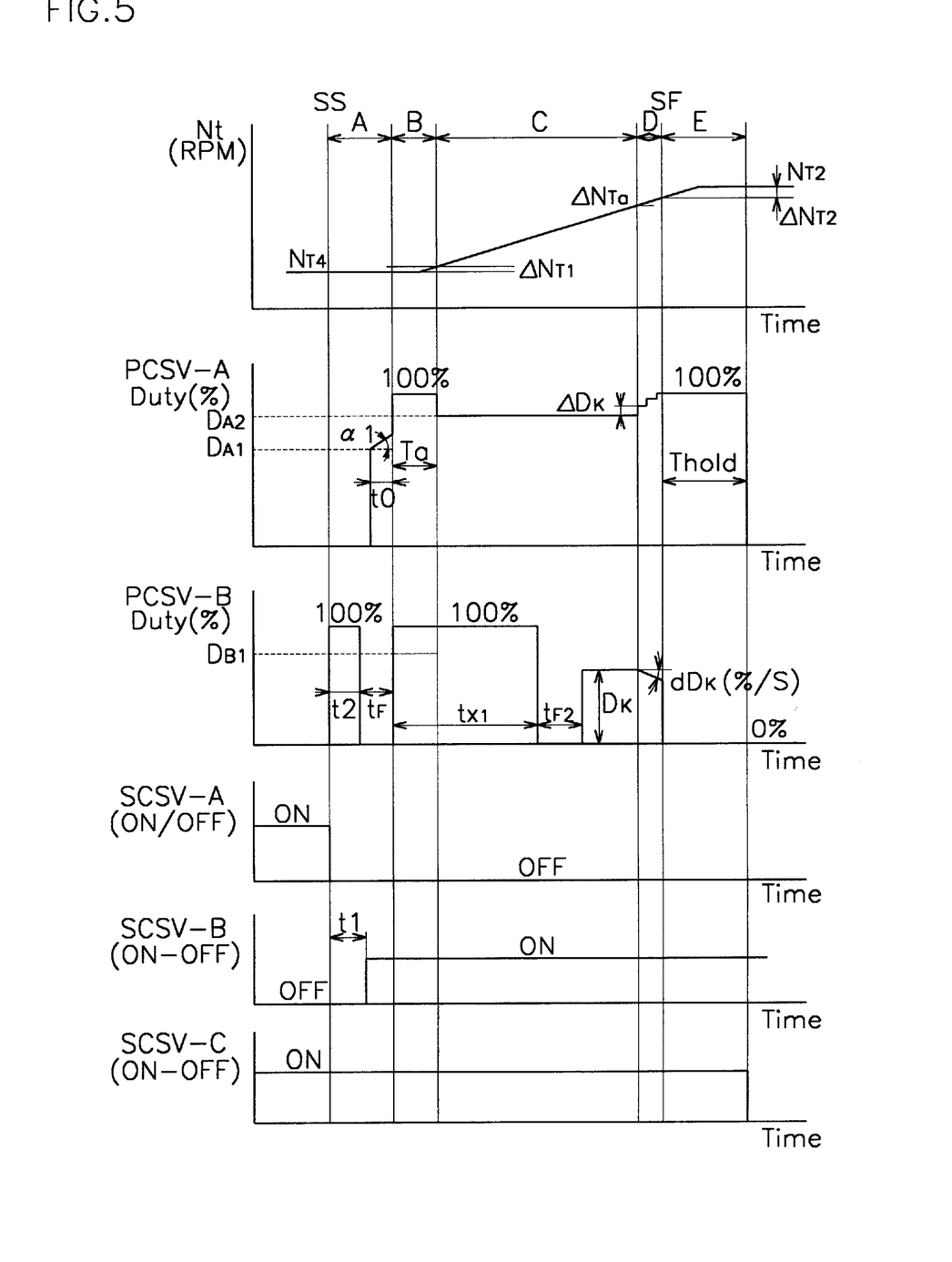
FIG. 5 is a duty control pattern diagram at an initial period of forced downshift of an automatic transmission according to a preferred embodiment of the present invention.
Figure 6:
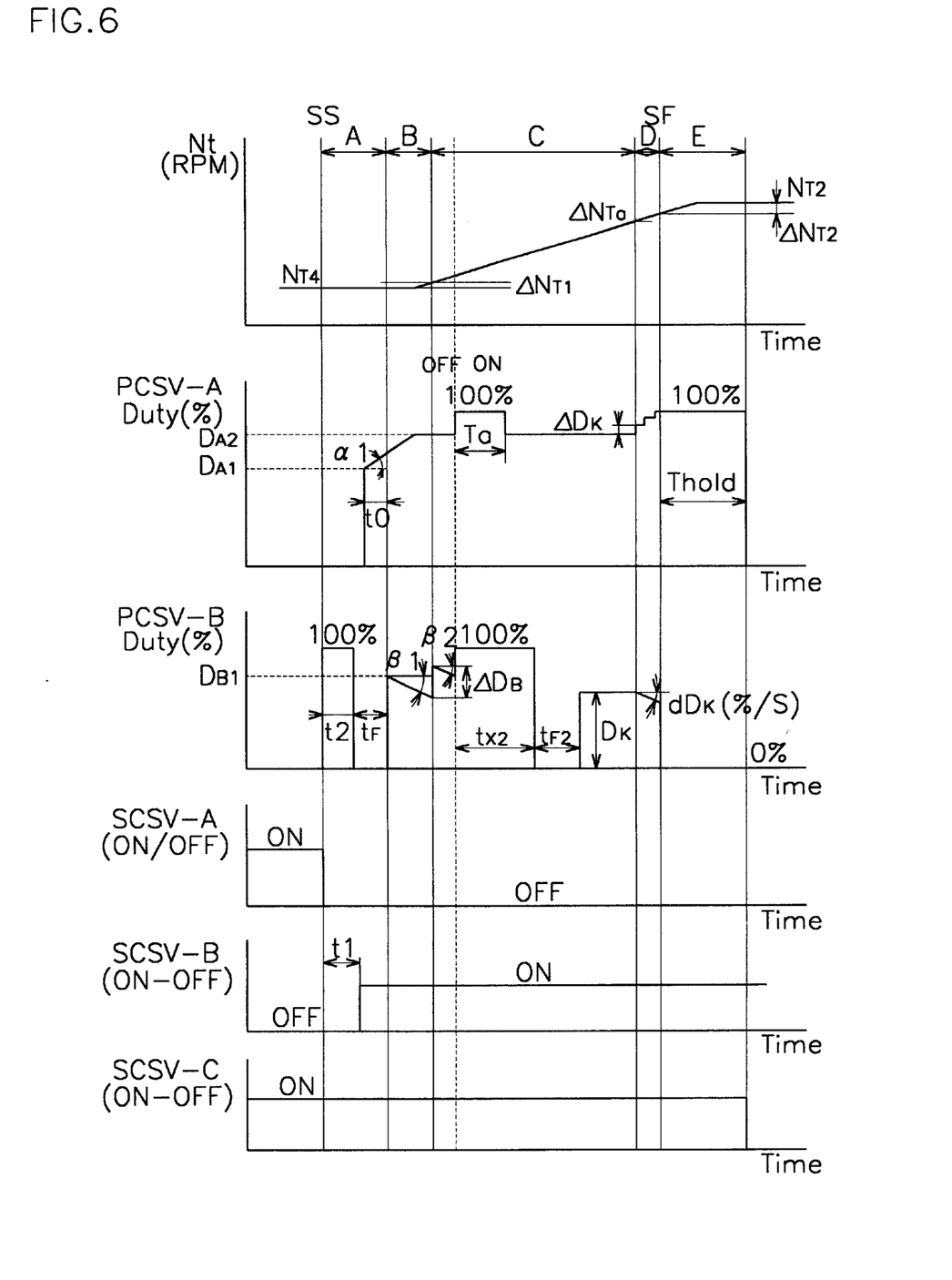
FIG. 6 is a duty control pattern diagram at a intermediate period of forced downshift of an automatic transmission according to a preferred embodiment of the present invention.
Figure 7:
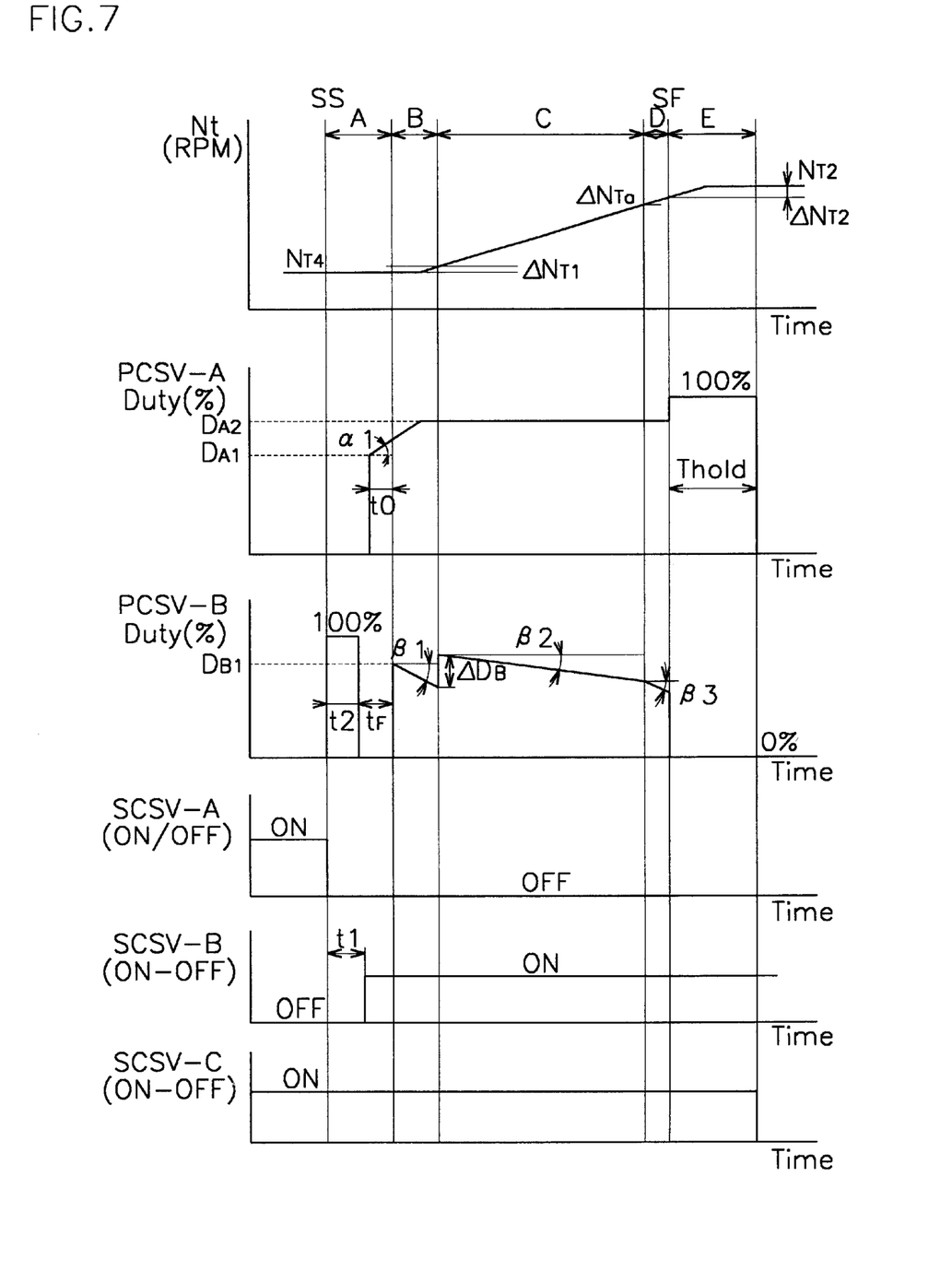
FIG. 7 is a duty control pattern diagram at an end period of forced downshift of an automatic transmission according to a preferred embodiment of the present invention.

When performing a forced 4–2 downshift in the hydraulic control system as described above, control is conducted using a duty pattern as shown in FIGS. 3a and 3b. As shown respectively in FIGS. 5–7, if shift signals of a forced 4–2 downshift are input, the first shift control solenoid valve SCSV-A is controlled to OFF immediately when the start of shifting is detected; the second shift control solenoid valve SCSV-B is maintained in an OFF state for a predetermined period of time (t1, 20 ms) after shifting is started, then controlled to ON; and the third shift control solenoid valve SCSV-C is continuously maintained in an ON state, then after a Thold has elapsed following the detection of synchronization, is immediately controlled to OFF.

The first and second pressure control solenoid valves PCSV-A and PCSV-B are duty controlled during the forced 4–2 downshift. In more detail, with reference to FIGS. 3a and 3b, after a forced 4–2 downshift is started according to various driving conditions in step S100, it is determined by the TCU if the first pressure control solenoid valve PCSV-A satisfies one of a plurality of pre-set conditions in step S200. At this time, the pre-set conditions include a first condition of $t_o \leq t_F$, a second condition of $t_F < t_o \leq (t_2+t_F)$, and a third condition of $(t_2+t_F)<t_o$. In the first, second and third conditions, $t_o$ is a pressure release time of the end clutch C3 where the standard value is 96 ms, $t_2$ is a displacement time of a valve spool of the rear clutch release valve 148 where the standard value is 60 ms, and $t_F$ is a fill time where the standard value is 140 ms.

In step S200, if it is determined that the first condition is satisfied such that the procedure is moved to step S300, duty is controlled to 0% from the moment shifting starts until $t_2+t_F+t_o$ in step S301. Next, at the moment of $t_2+t_F+t_o$, duty is controlled to $D_{A1}$, after which duty is controlled through slope α1 in step S302. Subsequently, it is determined if control is that from a power OFF forced 4–2 downshift to a power ON forced 4–2 downshift in step S330.

In step S200, if it is determined that the second condition is satisfied such that the procedure is moved to step S310, duty is controlled to 0% from the moment shifting starts until $t_2+t_F-t_o$ in step S311. Next, at the moment of $t_2+t_F-t_o$, duty is controlled to $D_{A1}$, after which duty is controlled through slope α1 in step S312. Subsequently, it is determined if control is that from a power OFF forced 4–2 downshift to a power ON forced 4–2 downshift in step S330.

Finally, in step S200, if it is determined that the third condition is satisfied such that the procedure is moved to step S320, duty is controlled to $D_{A1}$ when shifting starts, after which duty is controlled through slope α1 in step S321. Subsequently, it is determined if control is that from a power OFF forced 4–2 downshift to a power ON forced 4–2 downshift in step S330.

In step S330, if it is determined that control is that from a power OFF forced 4–2 downshift to a power ON forced 4–2 downshift, duty is controlled to $D_{A2}$ via the slope α1 such that duty is 100%, and the 100% duty is maintained for a predetermined period of time Ta in step S400. After the predetermined amount of time Ta has elapsed, duty is reduced to $D_{A3}$, and feedback duty control is performed until $(Nt_2-Nt)<\Delta NTa$ in step S410.

After the feedback duty control is completed, the duty is increased by a duty ratio $\alpha D_K$ every period starting from $(Nt_2-Nt)<\Delta NTa$ until synchronization is detected in step S420. If synchronization is detected, duty is controlled to 100% and maintained for a predetermined period of time Thold, after which duty is controlled to 0% in step S430. Accordingly, power ON forced 4–2 downshift control of the first pressure control solenoid valve PCSV-A at an initial period of power OFF forced 4–2 downshift control is completed.

$D_{A1}$, above is an initial duty value of the end clutch C3 where a standard value is 72%, and a standard value of $\alpha 1$ is 32% per second. Also, it is determined that synchronization is occurring where the condition of $(Nt_2-Nt)<\Delta NT_2$ is satisfied, and a standard value of the predetermined period of time Thold is 60 ms.

In step S330, if it is determined that control is not that from a power OFF forced 4–2 downshift to a power ON forced 4–2 downshift, duty is controlled to $D_{A3}$ via slope $\alpha 1$, and this level of duty is maintained in step S500. Next, in step S510, it is determined if control is that from a power OFF forced 4–2 downshift to a power ON forced 4–2 downshift. If it is, duty is controlled to 100% then maintained for the predetermined amount of time Ta in step S520. After the duty is maintained at 100% for the predetermined amount of time Ta, duty is reduced to $D_{A2}$, after which feedback duty control is performed until $(Nt_2-Nt)<\Delta NTa$ in step S530. Following the feedback duty control, the process is returned to step S420 where this step and step S430 are performed. Accordingly, power ON forced 4–2 downshift control of the first pressure control solenoid valve PCSV-A at an intermediate period of power OFF forced 4–2 downshift control is completed.

In step S510, if it is determined control is not that from a power OFF forced 4–2 downshift to a power ON forced 4–2 downshift, duty is maintained at $D_{A3}$ until synchronization is detected, after which duty is controlled to 100% and maintained for the predetermined period of time Thold in step S511. Next, duty is controlled to 0% in step S512. Accordingly, even if power ON forced 4–2 downshift control of the first pressure control solenoid valve PCSV-A at an end period of power OFF forced 4–2 downshift control is performed, power OFF forced 4–2 downshift control is continued, and duty control of the first pressure control solenoid valve PCSV-A is completed in step S512 above.

In the above, $D_{A3}$ is an end clutch torque release duty value where the standard value is 87%.

Figure 4A:
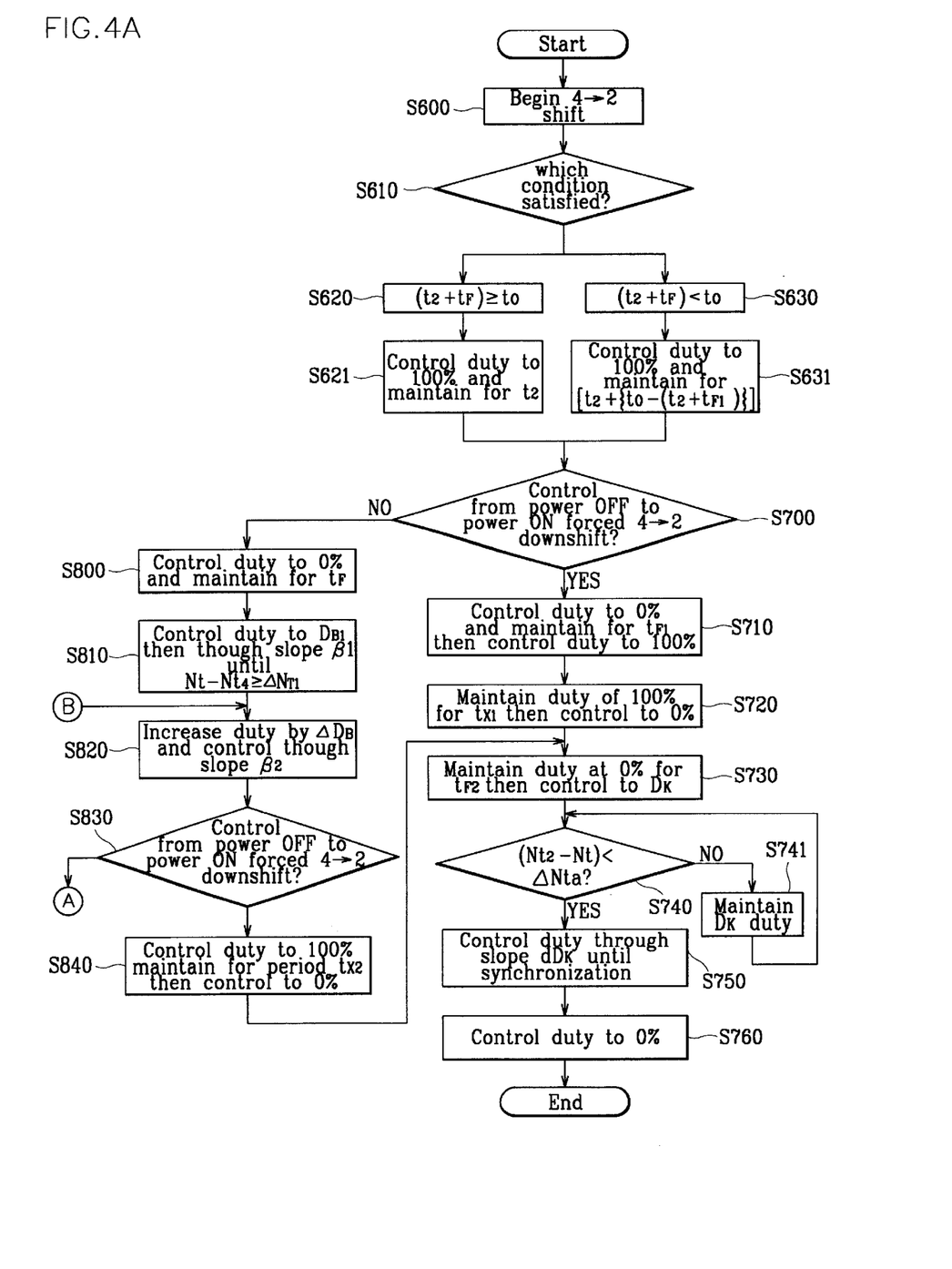
FIGS. 4a and 4b are flow charts of a method for controlling a second pressure control solenoid valve during a forced downshift according to a preferred embodiment of the present invention.
Figure 4B:
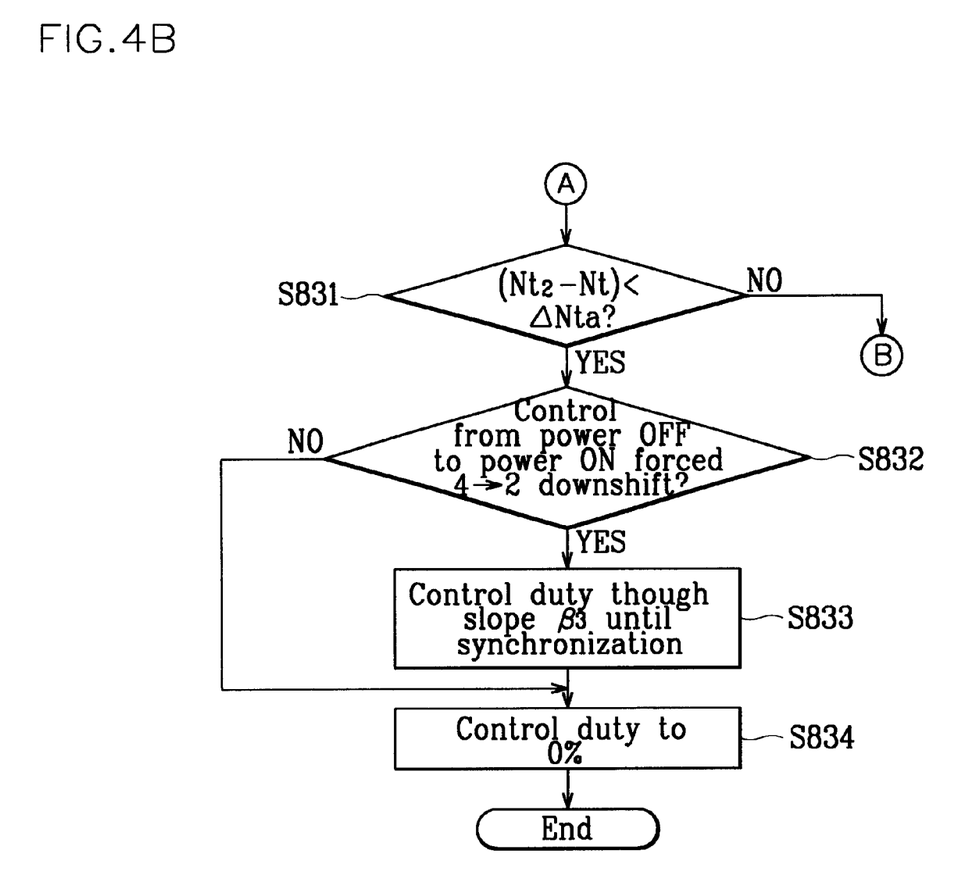

FIGS. 4a and 4b are flow charts of a method for controlling the second pressure control solenoid valve PCSV-B during a forced 4–2 downshift. First, a forced 4–2 downshift is started according to various driving conditions in step S600. Next, it is determined by the TCU if the second pressure control solenoid valve PCSV-B satisfies one of two pre-set conditions in step S610. At this time, the pre-set conditions include a fourth condition of $(t_2+t_F)>t_o$, and a fifth condition of $(t_2+t_F)<t_o$. In the fourth and fifth conditions, $t_o$ is a pressure release time of the end clutch C3 where the standard value is 96 ms, $t_2$ is a displacement time of a valve spool of the rear clutch release valve 148 where the standard value is 60 ms, and $t_F$ is a fill time where the standard value is 140 ms.

In step S610, if it is determined that the fourth condition is satisfied such that the procedure is moved to step S620, duty is immediately controlled to 100% at the start of shifting and maintained for a period of $t_2$ in step S621. However, if it is determined in step S610 that the fifth condition is satisfied such that the procedure is moved to step S630, duty is immediately controlled to 100% at the start of shifting and maintained for a period of $[t_2+\{t_o-(t_2+t_F)\}]$ in step S631.

After control as in either step S621 or S631, it is determined if control is that from a power OFF forced 4–2 downshift to a power ON forced 4–2 downshift in step S700. In step S700, if it is determined that conditions for control from a power OFF forced 4–2 downshift to a power ON forced 4–2 downshift during the maintaining of 100% duty in steps S621 and S631 are satisfied, duty is controlled to 0% and maintained for a period of $t_{F1}$, and after this period has elapsed duty is again controlled to 100% in step S710. Subsequently, duty of 100% is maintained for a period of $t_{X1}$, then controlled to 0% in step S720.

Next, duty is maintained at 0% for a period of $TF_2$, then controlled to $D_K$ in step S730, a duty of DK is maintained until $(Nt_2-Nt)<\Delta Nta$ in steps S740 and S741. If the condition of $(Nt_2-Nt)<\Delta Nta$ is satisfied in step S740, duty is controlled through slope $dD_K$ until synchronization is detected in step S750, after which duty is controlled to 0% in step S760. Accordingly, power ON forced 4–2 downshift control of the second pressure control solenoid valve PCSV-B at an initial period of power OFF forced 4–2 downshift control is completed.

However, in step S700, if it is determined that conditions for control from a power OFF forced 4–2 downshift to a power ON forced 4–2 downshift are not satisfied, duty is controlled to 0% and maintained for a period of $t_{F1}$, in step S800. Next, duty is controlled to $D_{B1}$, then controlled through slope $\beta 1$ until $Nt-Nt4>\Delta N_{T1}$ in step S810. Following this step, duty is increased by as much as $\Delta D_B$ and controlled through slope $\Delta 2$ in step S820. Subsequently, it is determined if conditions for control from a power OFF forced 4–2 downshift to a power ON forced 4–2 downshift are satisfied in step S830.

In step S830, if it is determined that the conditions are satisfied, duty is controlled to 100% and maintained for a period of $t_{X2}$, then controlled to 0% in step S840. Next, duty is maintained at 0% for a period of $T_{F1}$, after which duty is controlled to $D_K$ in step S730. Following this step, a duty of DK is maintained until $(Nt_2-Nt)<\Delta Nta$ in steps S740 and S741.

Figure 9:
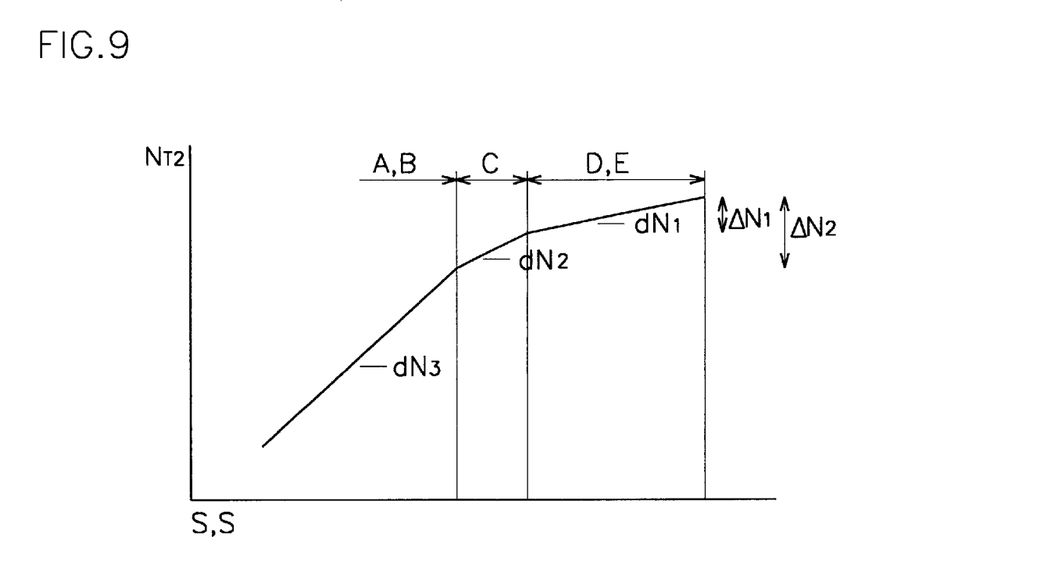
FIG. 9 is a graph showing variations in turbine revolutions when shifting in a power ON state.

In the above, $t_{X1}$ and $t_{X2}$ are calculated every calculation period from the start of shifting until Nt reaches $Nt_2$ as shown in FIG. 9.

When Nt is at intervals A and B, $t_{X1}$=remaining time of intervals A and B+utilization time of interval C+utilization times of intervals D and E. That is, $t_{X1}$ is calculated using the following equation:

$$t_{X1} = \frac{[(N_{t2}-XN_2)-Nt]/60}{dN_{i3}} + \frac{XN_2-XN_1}{dN_{i2}} + \frac{XN_1/60}{dN_{i1}}$$

When Nt is at interval C, $t_{X2}$=remaining time of interval C+utilization times of intervals D and E. That is, $t_{X2}$ is calculated using the following equation:

$$t_{X2} = \frac{[(N_{t2}-XN_1-Nt]/60}{dN_{i2}} + \frac{XN_1/60}{dN_{i1}}$$

If the condition of $(Nt_2-Nt)<\Delta Nta$ is satisfied in step S740, duty is controlled through slope $dD_K$ until synchronization is detected in step S750, after which duty is controlled to 0% in step S760. Accordingly, power ON forced 4–2 downshift control of the second pressure control solenoid valve PCSV-B at an intermediate period of power OFF forced 4–2 downshift control is completed.

However, in step S830 above, if it is determined that conditions for control from a power OFF forced 4–2 downshift to a power ON forced 4–2 downshift are not satisfied, duty is controlled through slope β2 until the condition of $(Nt_2-Nt)<\Delta Nta$ is satisfied in step S831. Next, after the condition of $(Nt_2-Nt)<\Delta Nta$ is satisfied, it is again determined if conditions for control from a power OFF forced 4–2 downshift to a power ON forced 4–2 downshift are satisfied in step S832.

If it is determined that the conditions are satisfied in step S832, duty is controlled through slope β3 until synchronization is detected in step S833, and if synchronization is detected, duty is controlled to 0% in step S834. Accordingly, power ON forced 4–2 downshift control of the second pressure control solenoid valve PCSV-B at an end period of power OFF forced 4–2 downshift control is completed.

However, in step S832 above, if it is determined that conditions for control from a power OFF forced 4–2 downshift to a power ON forced 4–2 downshift are not satisfied, step S833 is skipped, and duty is controlled through slope β2 until synchronization is detected, and if synchronization is detected, duty is controlled to 0% in step S834, thereby completing shifting and duty control of the second pressure control solenoid valve PCSV-B.

In the above, $D_{B1}$ is 50% (0.5×2.56) when $N_o \geq 1500$ rpm, and 60% (0.6×2.56) when $N_o<1500$ rpm. Also, $D_B$ is 10% (0.1×2.56) when $N_o>1500$ rpm, and 5% (0.05×2.56) when $N_o<1500$ rpm. Further, β1 and β2 are respectively 28 and 16% per second, and synchronization is determined to be detected when $Nt_2-Nt<\Delta Nt_2$.

Figure 8:
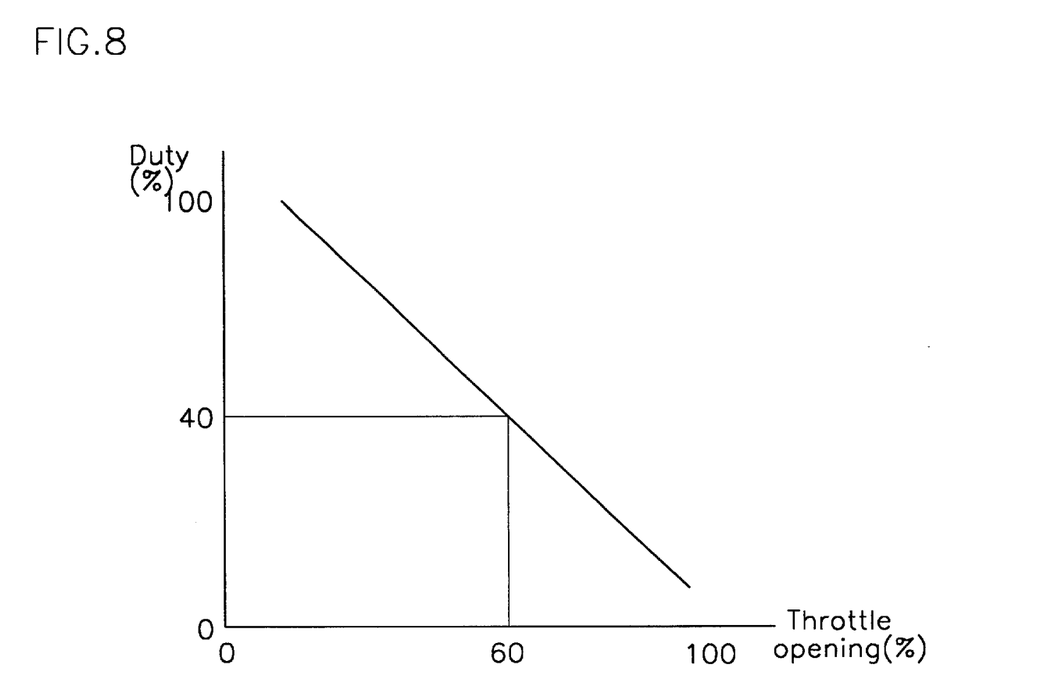
FIG. 8 is a graph showing a relation between a duty ratio and a throttle valve opening according to a preferred embodiment of the present invention.

Slope β3 above is varied according to changes in throttle valve opening as shown in FIG. 8. That is, when the throttle valve opening is 60% in a power OFF state, duty is 40%, and when the throttle valve opening is 80% in a power ON state, duty is 70%. Accordingly, slope β3 has a value of 40−70=−30% per second as the throttle valve opening varies from 60% to 80%.

In the forced downshift control method for automatic transmissions of the present invention described above, by the duty control of the first and second pressure control solenoid valves as described above, the generation of shift shock when changing from a power OFF to a power ON state during forced 4–2 downshifting is prevented using feedback duty control. As a result, overall shift quality and ride comfort are improved.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A forced downshift control method for automatic transmissions in which if shift signals of a forced 4–2 downshift are input, a first shift control solenoid valve (SCSV-A) is controlled to OFF immediately when the start of shifting is detected; a second shift control solenoid valve (SCSV-B) is maintained in an OFF state for a predetermined period of time (t1) after said shifting is started, then controlled to ON; a third shift control solenoid valve (SCSV-C) is continuously maintained in an ON state, then after a threshold (Thold) has elapsed following the detection of synchronization, is immediately controlled to OFF; and first and second pressure control solenoid valves (PCSV-A) and (PCSV-B) are duty controlled, the method comprising the steps of:

performing a first open-loop duty control operation to complete shifting through control of the first pressure control solenoid valve (PCSV-A) by comparing, based on three conditions, and end clutch input release time $t_o$ with a filter time $t_F$ and a displacement time t2 of a spool of a rear clutch and determining which of the three conditions is satisfied, and performing said first open-loop duty control operation according to the condition that is satisfied and determining if conditions for control from a power OFF forced 4–2 downshift to a power ON forced 4–2 downshift are satisfied, then performing the first open-loop duty control operation if the conditions are met;

performing a second duty control operation to complete shifting by performing a second open-loop duty control operation if said conditions for control from a power OFF forced 4–2 downshift to a power ON forced 4–2 downshift are not satisfied, then determining if said conditions for control from a power OFFG forced 4–2 downshift to a power ON forced 4–2 downshift are now satisfied, and performing the second duty control operation if said conditions are met;

performing a third open-loop duty control operation, regardless of variations in power conditions, to complete shifting if said conditions for control from a power OFF forced 4–2 downshift to a power ON forced 4–2 downshift are not satisfied;

performing a fourth open-loop duty control operation to complete shifting through control of the second pressure control solenoid valve (PCSV-B) by comparing, based on two conditions, the end clutch input release time ($t_o$) with the filter time and the displacement time of the spool of the rear clutch and determining which of the two conditions is satisfied, and performing the fourth open-loop duty control operation according to the condition that is satisfied and determining if conditions for control from a power OFF forced 4–2 downshift to a power ON forced 4–2 downshift are satisfied, then performing the fourth open-loop duty control operation if the conditions are met;

performing a fifth duty control operation to complete shifting by performing a fifth open-loop duty control operation if said conditions for control from a power OFF forced 4–2 downshift to a power ON forced 4–2 downshift are not satisfied, then determining if said conditions for control from a power OFF forced 4–2 downshift to a power ON forced 4–2 downshift are now satisfied, and performing the fifth duty control operation if the conditions are met; and performing a sixth open-loop duty control operation, regardless of variations in power conditions, to complete shifting if said conditions for control from a power OFF forced 4–2 downshift to a power ON forced 4–2 downshift are not satisfied.

2. The forced downshift control method of claim 1 wherein the first open-loop duty control operation is realized by controlling duty from 0% to $D_{A1}$, then through slope α1.

3. The forced downshift control method of claim 1, wherein the first duty control operation is realized by controlling duty to 100% and maintaining duty at 100% for a period of Ta, then reducing duty to $D_{A2}$ and performing feedback control until a condition of $(Nt_2-Nt)<\Delta Nta$ is satisfied; increasing duty by $\Delta Dk$ every period until synchronization is detected after the condition of $(Nt_2-Nt)<\Delta Nta$ is satisfied; and controlling duty to 100% if synchronization is detected, then maintaining duty at 100% for a period of said threshold (Thold).

4. The forced downshift control method of claim 1, wherein the second open-loop duty control operation is realized by controlling duty from 0% to $D_{A1}$, then to $D_{A2}$ through slope $\alpha 1$, after which duty is maintained at $D_{A2}$.

5. The forced downshift control method of claim 1, wherein the second duty control operation is realized by controlling duty to 100% and maintaining duty at 100% for a period of Ta, then reducing duty to $D_{A2}$ and performing feedback control until a condition of (Nt.

6. The forced downshift control method of claim 1, wherein the third open-loop duty control operation is realized by controlling duty from 0% to $D_{A1}$, then to $D_{A2}$ through slope $\alpha 1$; maintaining duty at $D_{A2}$ until synchronization is detected; controlling duty to 100% after synchronization is detected, then maintaining duty at 100% for a period of said threshold (Thold); and controlling duty to 0% after the period of said threshold (Thold) has elapsed, thereby completing shifting.

7. The forced downshift control method as in any one of claims 2, 4 or 6 wherein a standard value of $t_o$ is 96 ms.

8. The forced downshift control method as in any one of claims 2, 4 or 6 wherein a standard value of $D_{A1}$ is 72%, and a standard value of $\alpha 1$ is 32% per second.

9. The forced downshift control method as in any one of claims 3, 5 or 6, wherein a standard value of said threshold (Thold) is 60 ms.

10. The forced downshift control method as in any one of claims 4, 5 or 6, wherein a standard value of $D_{A2}$ is 87%.

11. The forced downshift control method of claim 1, wherein the fourth open-loop duty control operation is realized by controlling duty to 100% immediately at the start of shifting, maintaining duty at 100% for a period of $t_2$ or $[t_2+\{t_o-(t_2+t_F)\}]$, then controlling duty to 0%; and maintaining duty at 0% for a period of $t_F$.

12. The forced downshift control method of claim 1, wherein the fourth duty control operation is realized by controlling duty to 100%; maintaining duty at 100% for a period of $t_{X1}$, then controlling duty to Dk %; maintaining duty at Dk % until a condition of $(Nt_2-Nt)<\Delta Nta$ is satisfied, and controlling duty through slope dDk until synchronization is detected; and controlling duty to 0% after synchronization is detected.

13. The forced downshift control method of claim 1, wherein the fourth open-loop duty control operation is realized by controlling duty to 10% immediately at the start of shifting, maintaining duty at 100% for a period of $t_2$ or $[t_2+\{t_o-(t_2+t_F)\}]$, then controlling duty to 0%; maintaining duty at 0% for a period of $t_F$, and controlling duty to $D_{B1}$ then through slope $\beta 1$ until a condition of $(Nt-Nt_4)\geq \Delta Nt1$ is satisfied; and increasing duty by $\Delta D_B$ and controlling duty through slope $\beta 2$.

14. The forced downshift control method of claim 1, wherein the fourth duty control method is realized by controlling duty to 100%; maintaining duty at 100% for a period of $t_{X2}$ then controlling duty to 0%; maintaining duty at 0% for a period of $t_{F2}$, and controlling duty to Dk %; maintaining duty at Dk % until a condition of $(Nt_2-Nt)<\Delta Nta$ is satisfied, then controlling duty through slope dDk until synchronization is detected; and controlling duty to 0% after synchronization is detected.

15. The forced downshift control method of claim 1, wherein the fifth open-loop duty control operation is realized by controlling duty to 100% immediately at the start of shifting, maintaining duty at 100% for a period of $t_2$ or $[t_2+\{t_o-(t_2+t_F)\}]$, then controlling duty to 0%; maintaining duty at 0% for a period of $t_F$, and controlling duty to $D_{B1}$ then through slope $\beta 1$ until a condition of $(Nt-Nt_4)\geq \Delta Nt1$ is satisfied; and increasing duty by $\Delta D_B$ and controlling duty through slope $\beta 2$ until a condition of $Nt_2-Nt<\Delta Nta$ is satisfied.

16. The forced downshift control method of claim 1, wherein the fifty duty control operation is realized by controlling duty through slope $\beta 3$ starting from when a condition of $Nt_2-Nt<\Delta Nta$ is detected; and controlling duty to 0% after synchronization is detected, thereby completing shifting.

17. The forced downshift control method of claim 16, wherein said slope $\beta 3$ is compensated according to variations in throttle opening using a map stored in a memory.

18. The forced downshift control method of claim 1, wherein the sixth open-loop duty control operation is realized by controlling duty to 100% immediately at the start of shifting, maintaining duty at 100% for a period of $t_2$ or $[t_2+\{t_o-(t_2+t_F)\}]$, then controlling duty to 0%; maintaining duty at 0% for a period of $t_F$, and controlling duty to $D_{B1}$ then through slope $\beta 1$ until a condition of $(Nt-Nt_4)\geq \Delta Nt1$ is satisfied; increasing duty by $\Delta D_B$ and controlling duty through slope $\beta 2$ until synchronization is detected; and controlling duty to 0% after synchronization is detected to complete shifting.

19. The forced downshift control method as in any one of claims 11, 13, 15 or 18 wherein a standard value of $t_2$ is 60 ms.

20. The forced downshift control method as in any one of claims 11, 13, 15 or 18 wherein a standard value of $T_F$ is 140 ms.

21. The forced downshift control method as in any one of claims 13, 15 or 18, wherein said slope $\beta 1$ is 28% per second.

22. The forced downshift control method as in any one of claims 15 or 18, wherein said slope $\beta 2$ is 16% per second.

23. The forced downshift control method of claim 1 wherein the three conditions include a first condition of $t_o \leq t_F$, a second condition of $t_F<t_o \leq (t_2+t_F)$, and a third condition of $(t_2+t_F)<t_o$.

24. The forced downshift control method of claim 23 wherein if the first condition is satisfied, duty is controlled to 0% from the moment shifting starts until $t_2+t_F+t_o$, then at the moment of $t_2+t_F+t_o$, duty is controlled to $D_{A1}$, after which duty is controlled to a slope $\alpha 1$.

25. The forced downshift control method of claim 23 wherein if the second condition is satisfied, duty is controlled to 0% from the moment shifting starts until $t_2+t_F-t_o$, then at the moment of $t_2+t_F-t_o$, duty is controlled to $D_{A1}$, after which duty is controlled to a slope $\alpha 1$.

26. The forced downshift control method of claim 23 wherein if the third condition is satisfied, duty is controlled to $D_{A1}$ when shifting starts, after which duty is controlled to a slope $\alpha 1$.

* * * * *